Aug. 28, 1951 J. B. FLYNN 2,566,182
AUTOMOBILE REAR DECK LID PROP
Filed May 14, 1948 3 Sheets-Sheet 1

INVENTOR.
John B. Flynn
BY
Barnes, Kisselle, Laughlin & Raisch
ATTORNEYS

Aug. 28, 1951 J. B. FLYNN 2,566,182
AUTOMOBILE REAR DECK LID PROP
Filed May 14, 1948 3 Sheets-Sheet 2
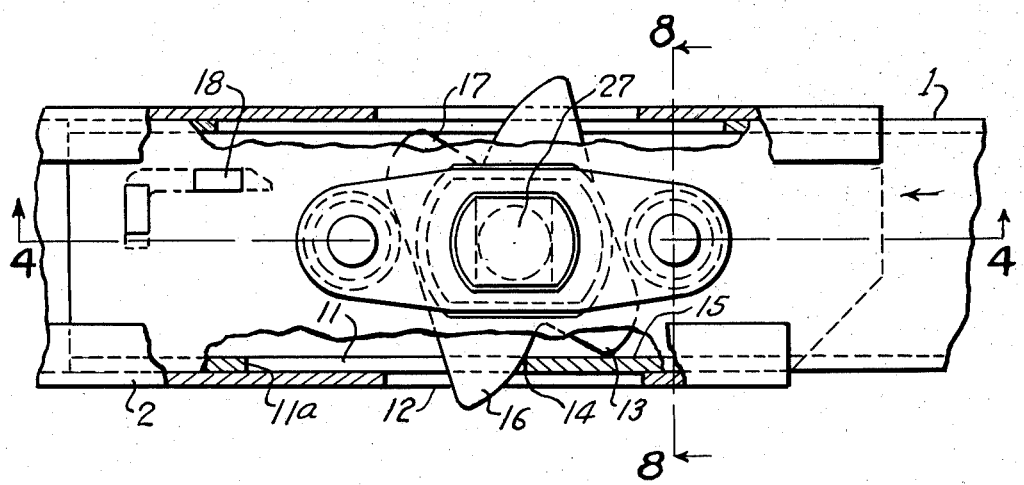
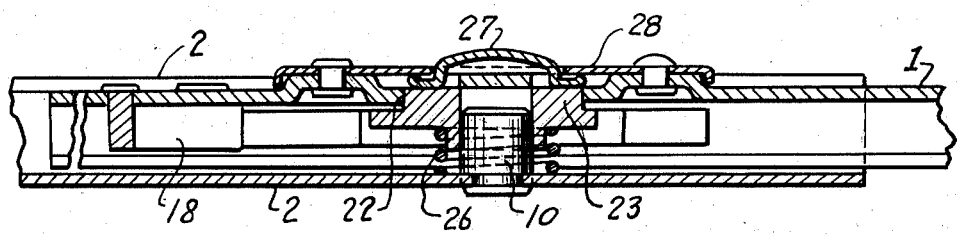
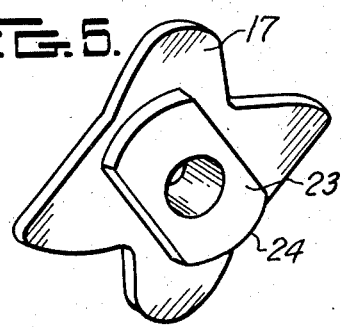
INVENTOR.
John B. Flynn
BY
Barnes, Kisselle, Laughlin & Raisch
ATTORNEYS

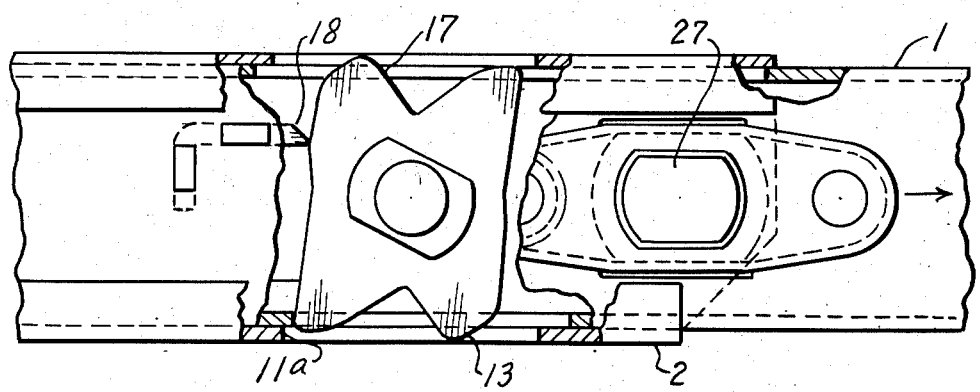
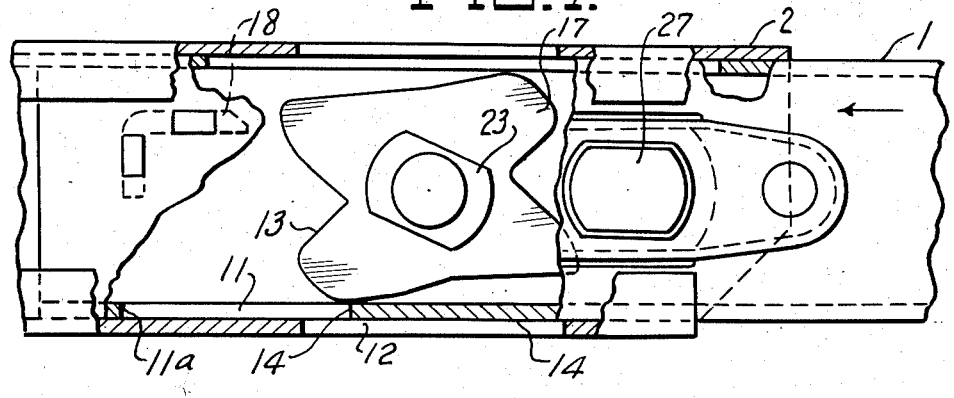
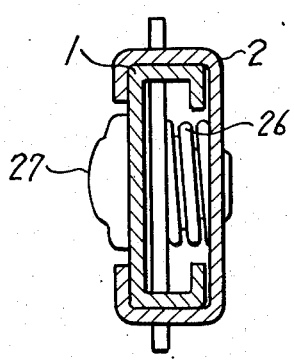

Patented Aug. 28, 1951

2,566,182

UNITED STATES PATENT OFFICE 2,566,182

AUTOMOBILE REAR DECK LID PROP

John B. Flynn, Detroit, Mich., assignor to General Motors Corporation, Detroit, Mich., a corporation of Delaware Application May 14, 1948, Serial No. 27,027

4 Claims. (Cl. 217—60)

This invention relates to automobile rear deck lid props or props for the doors of station wagons or other vehicles. It can also be used for the lids of trunks, cabinets, etc.

One of the popular rear deck lid props now used on passenger cars operates on the principle of raising the lid to its extreme upper position and when the lid is dropped back a slight distance the prop latches. To release the prop the lid is again raised to its extreme position and when dropped the second time the latch releases. A prop of this kind is described and claimed in the Collins Patent 1,710,570.

A prop of this kind has worked very satisfactorily but it is not fool-proof because should the lid be jolted upwardly, which may easily happen when traveling over a rough road, the prop will release and drop the lid. This is disadvantageous if the driver of the car desires to drive with the prop raised to accommodate a load that protrudes from the rear compartment or if by chance passengers are being carried in the rear compartment, as is sometimes done. A prop of this type is therefore rather unreliable, especially when used on the rear door of station wagons, which are often used to carry projecting loads or even passengers.

The present invention has for its object a simple arrangement for locking the prop so that it can not be released except when the release is deliberately undertaken.

In the drawings:

Figure 3 is a fragmentary elevation of the prop showing the sections of the prop in locked position.

Figure 4 is a section of the line 4—4 of Figure 3.

Figure 5 is a perspective of the latch or star wheel.

Figure 6 is a fragmentary elevational and sectional view showing the parts of the prop when they are drawn out to their extended position to release the prop sections.

Figure 7 is a similar view showing the parts when the star wheel or latch is struck by the end of the slot of the upper channel member to release the latch and allow the sections to telescope together.

Figure 8 is a cross section through the channels on the line 8—8 of Figure 3.

Figure 1:
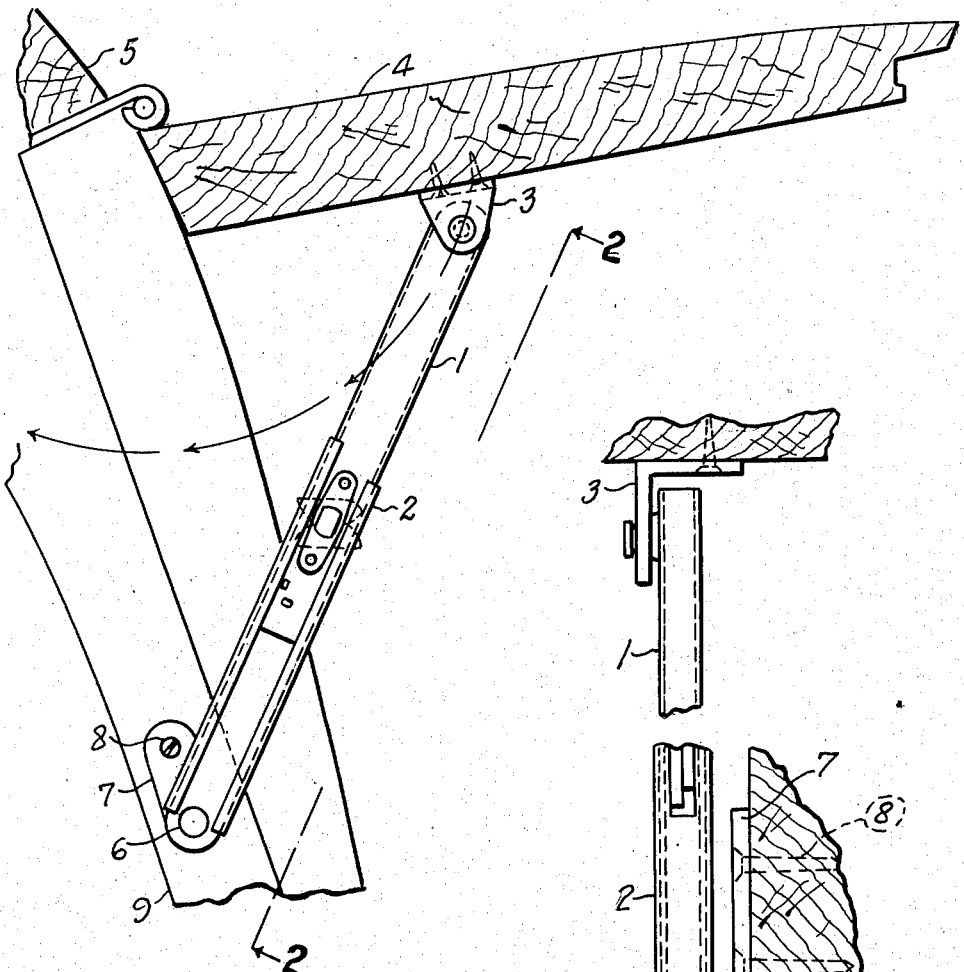
Figure 1 is a fragmentary vertical section through a rear portion of a station wagon showing the improved prop used in connection with the rear door of the station wagon.
Figure 2:
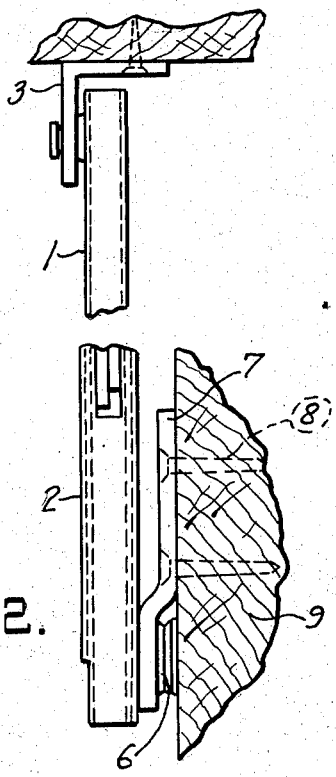
Figure 2 is a section on the line 2—2 of Figure 1.

There is an upper channel section 1 which telescopes with a lower larger channel section 2. The upper section is pivoted to the bracket 3 secured to the door 4 on the station wagon 5. The lower section 2 is pivoted at 6 to an anchor strip 7 secured by screws 8 to the wall 9 of the rear compartment of the station wagon.

Refer to Figures 3 and 6. Figure 3 shows the star wheel or latch jammed with the telescoping sections so that they are locked together. When the slots 11 and 12 (Figure 6) lap over each other, the lug 13 of the star wheel jams with wall 15 of the inner channel 1. The star wheel is pivoted by pin 10 on the lower channel 2 (See Figure 4). The star wheel cannot rotate because the edge 14 of slot 11 rests on top of prong 16 and that tends to rotate the wheel but prong 13 jams against the side wall 15 of channel 1.

If one now lifts the lid upwardly, it will pull the sections and the star wheel into the position shown in Figure 6. The abutment 18 on the upper channel 1 strikes prong 17 on star wheel pivoted on lower channel 2 and kicks the star wheel around to position shown in Figure 6. Then upon one's dropping the raised door or lid, the upper edge 14 of slot 11 in channel 1 strikes the prong 13 and causes it to be turned around to the position shown in Figure 7, and the lid is now free to drop as the star wheel is in a position where none of the prongs will be caught by the slots in the channels.

This much of the construction is old, and the principle of this, as already stated, is described in the Collins Patent, and a star wheel and interlocking structure quite similar is shown and described in the Lustig Patent 2,229,513.

The defect in this arrangement is that if the prop sections are accidentally extended by the jolting of the vehicle or the oscillation of the rear deck lid or door, then the prop will automatically release.

My improvement is calculated to make this prop fool-proof and not accidentally releasable. This is accomplished by a very simple arrangement. The inner channel 1 is provided with a recess or slot 22 into which is arranged to fit the boss 23 on the star wheel. This boss has sharp ends 24. Coil spring 26 normally presses the boss or key 23 into the locking recess 22 of the inner channel member. This locks the star wheel from turning and, consequently, it is impossible to move the telescoping sections when this star wheel is so locked.

A button 27 (Figure 4) is held above the spring-pressed star wheel by plate 28 riveted to the upper channel 1. By simply pressing the finger against the button 27 the key or boss 23 may be pressed out of the locking recess. This will release the star wheel and allow the two sections to be extended to their limit and then the lid dropped. The star wheel will function as heretofore stated and be kicked around releasing it from its locking position and the two channel sections may be telescoped and the lid or door closed.

What I claim is:

1. A prop or support for rear deck lids, doors of vehicles and other containers, having in combination a pair of telescoping or overlapping sections each with slots and one having a star wheel pivoted thereon and the other an abutment, when the sections are extended the abutment striking the star wheel and turning it and then when the sections are allowed to telescope a slight distance the star wheel jams in the slot of the section not carrying the star wheel and against the side wall of the same section thereby to lock the prop in extended position and when the two sections are extended a second time the star wheel encounters the abutment and the star wheel is turned to bring it into a position to be struck by a portion of the section which does not bear the star wheel and be thus kicked around to a position where all the prongs of the star wheel clear the slots of the two sections as the sections telescope and releasable means for locking the star wheel in the jammed position when the sections are extended and dropped back the first time, the said releasable means comprising a recess in one section and a locking member on the other section spring pressed into locking relation in said recess when the star wheel is in jammed position, the said locking member releasable by pressure when it is desired to extend the sections again.

2. A prop or support for rear deck lids, doors of vehicles and other containers, having in combination a pair of telescoping or overlapping sections each with slots and having a star wheel pivoted thereon and the other an abutment, when the sections are extended the abutment striking the star wheel and turning it and then when the sections are allowed to telescope a slight distance the star wheel jams in the slot of the section not carrying the star wheel and against the side wall of the same section thereby to lock the prop in extended position and when the two sections are extended a second time the star wheel encounters the abutment and the star wheel is turned to bring it into a position to be struck by a portion of the section which does not bear the star wheel and be thus kicked around to a position where all the prongs of the star wheel clear the slots of the two sections as the sections telescope and releasable means for locking the star wheel in the jammed position when the sections are extended and dropped back the first time, the said means comprising a non-circular recess on one section and a similarly shaped boss on the star wheel attached to the other section, the said boss and recess registering when the star wheel is locked in jammed position and a spring for pressing the star wheel toward the other section and the boss into the recess to lock the star wheel in its jammed position.

3. A prop or support for rear deck lids, doors of vehicles and other containers, having in combination a pair of telescoping or overlapping sections each with slots and having a star wheel pivoted thereon and the other an abutment, when the sections are extended the abutment striking the star wheel and turning it and then when the sections are allowed to telescope a slight distance the star wheel jams in the slot of the section not carrying the star wheel and against the side wall of the same section thereby to lock the prop in extended position and when the two sections are extended a second time the star wheel encounters the abutment and the star wheel is turned to bring it into a position to be struck by a portion of the section which does not bear the star wheel and be thus kicked around to a position where all the prongs of the star wheel clear the slots of the two sections as the sections telescope and releasable means for locking the star wheel in the jammed position when the sections are extended and dropped back the first time, the said means comprising a recess on one section and a boss on the star wheel attached to the other section, the said boss and recess registering when the star wheel is locked in jammed position, a spring for pressing the star wheel toward the other section and the boss into the recess to lock the star wheel against rotation in its jammed position and a movable button located in the recess of the section by which the star wheel and boss may be released from the locking position.

4. A prop or support for rear deck lids, doors of vehicles and other containers, having in combination a pair of telescoping or overlapping sections each with slots and having a star wheel pivoted thereon and the other an abutment, when the sections are extended the abutment striking the star wheel and turning it and then when the sections are allowed to telescope a slight distance the star wheel jams in the slot of the section not carrying the star wheel and against the side wall of the same section thereby to lock the prop in extended position and when the two sections are extended a second time the star wheel encounters the abutment and the star wheel is turned to bring it into a position to be struck by a portion of the section which does not bear the star wheel and be thus kicked around to a position where all the prongs of the star wheel clear the slots of the two sections as the sections telescope and releasable means for locking the star wheel in the jammed position when the sections are extended and dropped back the first time, the said means comprising a recess on one section and a boss on the star wheel attached to the other section, the said boss and recess registering when the star wheel is locked in jammed position, a spring for pressing the star wheel toward the other section and the boss into the recess to lock the star wheel in its jammed position and a movable button located in the recess of the section by which the star wheel and boss may be released from the locking position, and a plate secured to the prop section for supporting the push button in position over the spring-pressed star wheel.

JOHN B. FLYNN.

REFERENCES CITED

The following references are of record in the file of this patent:

UNITED STATES PATENTS

| Number | Name | Date |
| --- | --- | --- |
| 1,333,939 | Rudnick | Mar. 16, 1920 |
| 2,229,513 | Lustig | Jan. 21, 1941 |
| 2,253,161 | Atwood | Aug. 19, 1941 |